United States Patent [19]

Harris et al.

[11] Patent Number: 4,574,344

[45] Date of Patent: Mar. 4, 1986

[54] ENTRY CONTROL STORE FOR ENHANCED CPU PIPELINE PERFORMANCE

[75] Inventors: Richard L. Harris, San Jose; Robert W. Horst, Cupertino, both of Calif.

[73] Assignee: Tandem Computers Incorporated, Cupertino, Calif.

[21] Appl. No.: 537,038

[22] Filed: Sep. 29, 1983

[51] Int. Cl.⁴ .............................................. G06F 9/00
[52] U.S. Cl. ................................................... 364/200
[58] Field of Search ... 364/200 MS File, 900 MS File

[56] References Cited

U.S. PATENT DOCUMENTS 4,173,041 10/1979 Dvorak et al. ...................... 364/200

Primary Examiner—Raulfe B. Zache
Attorney, Agent, or Firm—Lyon & Lyon

[57] ABSTRACT

An entry control store in a central processing unit (CPU) is addressed by the next macroinstruction to be executed by the CPU and fetches the microcode for the first line of that macroinstruction. Subsequent lines of microcode for that macroinstruction are fetched from a main control store.

6 Claims, 2 Drawing Figures

ENTRY CONTROL STORE FOR ENHANCED CPU PIPELINE PERFORMANCE

FIELD OF INVENTION

The present invention relates to data processors and central processing units found in data processors. More particularly, the present invention relates to control store architecture for use in implementing macroinstructions using a series of microinstructions in pipelined microinstruction execution schemes.

BACKGROUND OF THE INVENTION

Central processing units (CPU's) which execute macroinstructions by using a series of microinstructions in a form of pipelined manner are known in the art. Pipelining microinstruction execution generally allows a faster instruction execution throughout since while one later phase or rank of a first instruction is being executed an earlier rank of a second instruction may begin to be executed.

Prior art pipelined control stores are usually sourced by an entry point table which decodes the macroinstruction to generate a pointer to the first microinstruction. That pointer is placed in a holding register from which it is used to access the control store. Subsequent microinstructions are addressed by either incrementing the value held in the holding register at each clock cycle or by using a field in the microcode of the first microinstruction to address the next and succeeding microinstructions.

The process by which a macroinstruction is used to fetch a microinstruction is usually a three clock cycle event in a two rank microcode scheme. A first clock cycle places the entry point table value in the holding register, a second clock cycle places the rank one microcode field in a register, and a third clock cycle places the rank two microcode field in a register. The registered values are then used to execute the microcode functions to actually execute the instruction. Any portion of microcode that is implemented following successive clock cycles, such as rank three or higher, is similarly executed.

Because of the nature of pipelined systems, multiple clock cycles for the execution of a single line of microcode is required. This fact of instruction execution is one of the factors which determines instruction throughput in data processing systems. Since throughput and speed are important considerations in data processing systems any improvement in the instruction execution portion of a data processing system will result in increased system performance.

Accordingly, there exists a need for a control store which is able to execute macroinstructions in fewer than the number of clock cycles which it currently takes to execute them.

It is therefore an object of the present invention to provide a control store which enables the execution of the first line of microcode of a macroinstruction in a pipelined CPU in fewer clock cycles than is possible in currently known systems.

It is a further object of the invention to provide a control store having an additional entry portion for providing the first line of microcode a clock cycle earlier than can be provided using current systems.

These and other objects of the present invention will be more clearly understood from an examination of the specification, drawings and accompanying claims.

BRIEF DESCRIPTION OF THE INVENTION

A control store arrangement is provided wherein an entry point table is provided with a macroinstruction from a next instruction register or similar device and supplies a pointer to a control store containing the microcode for the second line of the macroinstruction.

In addition, the information which addresses the entry point table also addresses an entry control store which contains the information for the first microinstruction for each macroinstruction. The control store contains all microcode for subsequent microinstructions for each macroinstruction.

A bit field preferably located in the next to the last line of microcode of each macroinstruction enables a mechanism to connect the entry control store rather than regular control store to a shared bus only at the time its contents are needed to implement the first line of microcode for a given macroinstruction. In this manner, execution of each macroinstruction may be begun a clock cycle earlier than is possible using prior art control store arrangements.

DETAILED DESCRIPTION OF THE INVENTION

Figure 1:
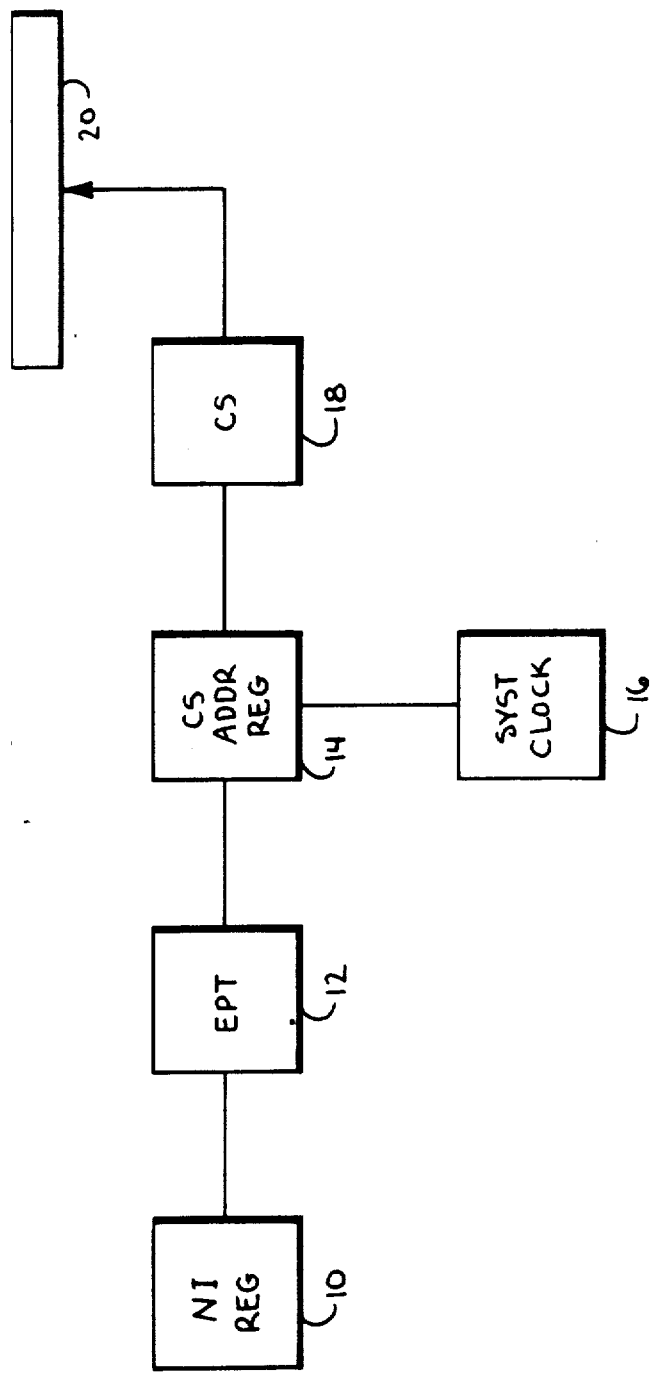
FIG. 1 is a block diagram of a typical prior art control store arrangement.

Referring first to FIG. 1, a block diagram of a typical prior art control store arrangement is shown. Next instruction register 10 holds an instruction which is decoded by the entry point table 12 which generates an address pointing to the first line of microcode of the instruction. The output of entry point table 12 is placed in control store address register 14 on the clock pulse from system clock 16 which follows the availability of the valid contents of next instruction register 10. After the clock pulse, the first line of encoded microcode is available as a pointer to the microcode contained in control store 18. This line of microcode is shown diagramatically as a bit field 20. Register 14 may be configured to increment the value it holds on each clock cycle to access subsequent lines of microcode for the macroinstruction. In addition, other methods may provide additional sources for addressing the control store 18. For instance, control store 18 may be driven by a multiplexer sourced by control store address register 14, a return stack and bit fields from the microcode to control branching as is known in the art.

As is known in the art, one or more registers (not shown) may be interposed between control store 18 and bit field 20, and particularly if a pipelined system is employed, at least two registers, one for rank and one for rank two will be employed. Thus, it will take a minimum of three clock cycles before rank two information is available at the output of the rank two register.

Figure 2:
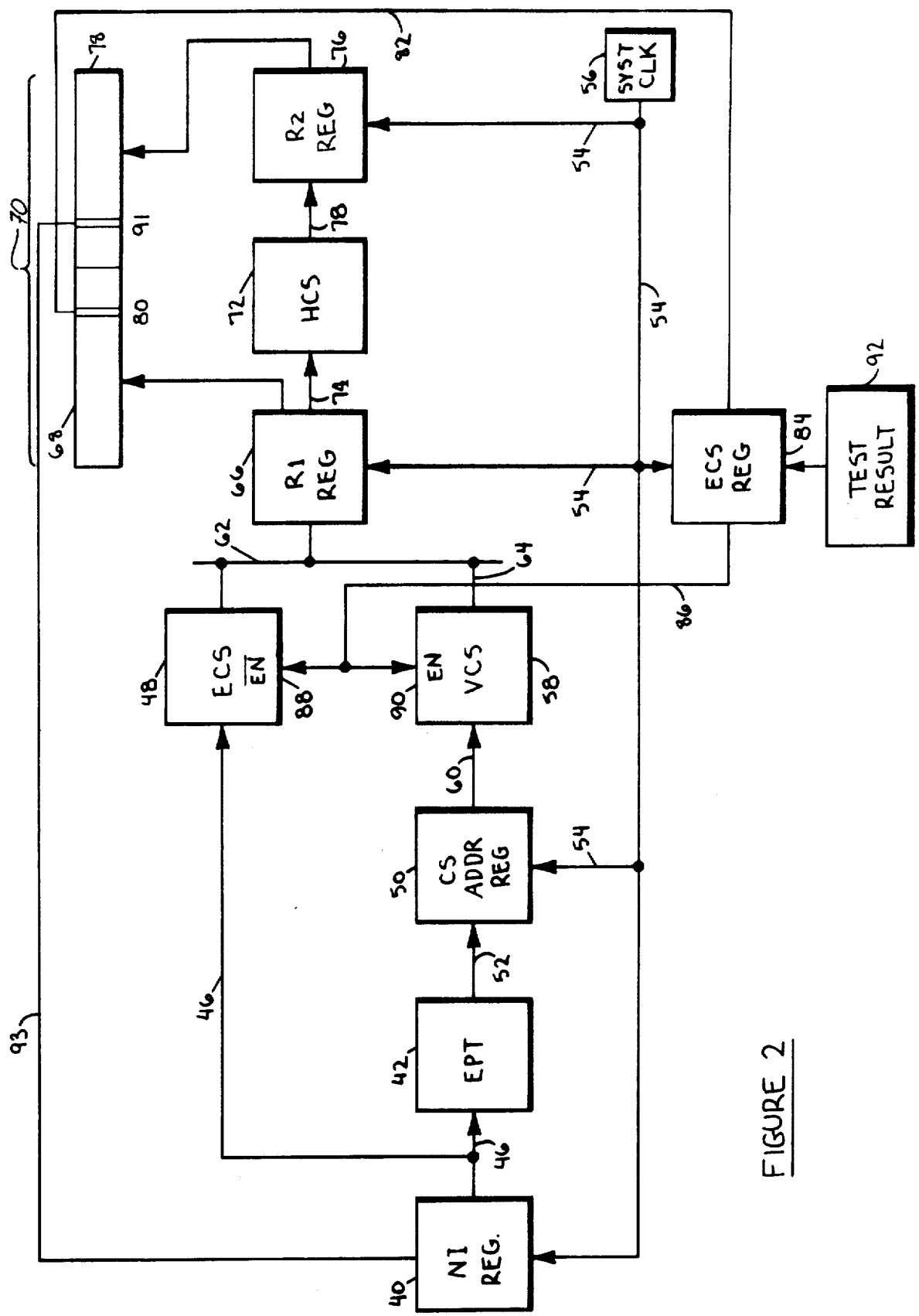
FIG. 2 is a block diagram of a control store configured according to the present invention.

Referring now to FIG. 2, a block diagram of a control store according to the present invention is depicted.

Next instruction register 40 contains an instruction which is decoded by entry point table 42. Specifically, the contents of next instruction register 40 address entry point table 42 via lines 46. Unlike the prior art, however, entry point table 42 does not contain a pointer to the first line of microcode for the macroinstruction being executed. Instead, it contains a pointer to the second line of microcode for the macroinstruction being executed. Entry point table 42 may be configured from read only memory, random access memory, or programmable logic arrays as is known in the art.

The first line of microcode for each macroinstruction is contained in entry control store 48, which has access to the contents of next instruction register 40 via line 46 as does entry point table 42. Otherwise the system of FIG. 2 may operate in accordance with the control store described and claimed in co-pending application Ser. No. 537,429, filed Sept. 29, 1983 assigned to the same assignee as this application, which is incorporated herein by reference.

The execution of the second and any following lines of microcode will be disclosed, followed by a disclosure of the manner in which the first line of microcode is placed into the pipeline at a point in time earlier than is possible using prior art configurations.

The output of entry point table 42 is clocked into control store address register 50 via lines 52 and clock line 54 from system clock 56, on a first clock cycle. After the necessary access time has passed, this output, which is a pointer to an address in vertical control store 58, is placed into vertical control store 58 via lines 60. Subsequent microinstructions are obtained either by incrementing the value stored in control store address register 50 using clock pulses from system clock 56 or by driving line 60 from a multiplexer (not shown) whose inputs include the output of control store address register 50 as well as a return stack and bit fields from microcode to control branching as is known in the art. After the necessary access time, the output of vertical control store 58 is placed on control store output lines 62 via lines 64 where it is clocked into the rank one register on a second clock cycle by a clock pulse from system clock 56.

Part of the bit field in the output of rank one register 66 may be partially or fully decoded microcode forming the rank one microcode field 68 portion of microcode bit field 70. In a preferred embodiment, another portion of the output of rank one register 66 may be used as a pointer to address horizontal control store 72 via lines 74, although those skilled in the art will appreciate that this is not necessary for the invention to function properly. After the necessary access time, the output of horizontal control store 72 is available to the input of rank two register 76 via lines 78. On a third clock cycle from system clock 56 via line 54 the output of horizontal control store 72 is placed into rank two register 76, and is available as rank two portion 78 of microcode bit field 70. However, those skilled in the art will realize that on this third clock cycle it is the second line of microcode being executed in rank two rather than the rank two information of the first line.

A selected bit field 80, which may be one or more bits within the rank one bit field 68 in microcode field 70 is used in conjunction with entry control store 48 to execute the first line of microcode. The state of this field, decoded if necessary, is placed via line 82 into entry control store enable register 84 on each clock cycle from system clock 56. The output of entry control store enable register 84, via line 86, is presented to the enable inputs of entry control store 48 and vertical control store 58. Input $\overline{EN}$ 88 of entry control store 48 is logic low active and input EN 90 of vertical control store 58 is logic high active. Since both entry control store 48 and vertical control store 48 share control store output bus 62, their $\overline{EN}$ and EN inputs assure that only one has control of the bus at any given time. This may be accomplished, as is known in the art, by multiplexing them both on to bus 62, or by selectively disabling the output drivers of one or the other of vertical control store 58 and entry control store 48. Most of the time vertical control store 58 has control of the bus, which means field 80 will cause ECS register 84 to contain a logic high level (a "one"). However, when the next macroinstruction has been loaded into next instruction register 40, typically during execution of the next to last microinstruction of the macroinstruction currently being executed, entry control store 48 takes control of control store output bus 62 and places the first line of microcode for that next macroinstruction on control store output bus 62. This process occurs a clock cycle earlier then it could be placed there if it entered the pipeline at the output of entry point table 42. In such case the instruction would need to be decoded in entry point table 41 and the pointer would have to wait for the next clock pulse to be placed in control store address register 50. The pointer would then access microcode from vertical control store 58 which would then be placed on control store output lines 62, before it could be clocked into in rank one register 66.

Another selected bit field 91 via line 93 acts to inhibit the clock pulse to next instruction register 40 except during the cycle the next instruction is to be loaded. This will happen one or more clock pulses before bit field 80 enables the entry control store 48. As the timing is instruction dependent, those skilled in the art will recognize when this has to take place with respect to a given instruction sequence.

To facilitate microbranching, the action of entry control store register 84 may be inhibited in order to continue execution of microinstructions out of vertical control store 58. In a preferred embodiment, the result of a test which is used to make the microbranching decision, shown diagramatically at 92 may be used to inhibit entry control store register 84 from selecting entry control store 48.

This feature is most significant for execution of macroinstructions which contain fewer than three lines of microinstructions. If the number of microinstructions is three or greater, system microcoders could improve pipelining by placing the directive to fetch the next macroinstruction and place it in next instruction register one microinstruction line sooner. This, of course, cannot be done with instructions having fewer than three lines.

With the present invention, macroinstructions having two lines of microcode may be executed without the need to insert a NOP (no operation) space fillers to in essence halt the system while the first pointer to the first line of microcode propagates through control store address register 50 in order to perform the instruction decode in vertical control store 58.

Those skilled in the art will recognize that the same mechanism which reduces the minimum macroinstruction execution time, also reduces the time required to execute macroinstruction branches.

In performing a macrobranch, the branch target is loaded into the next instruction register 40, but execution of the target macroinstruction cannot begin until the rank one portion of its first line of microcode is available on the control store output lines 62. With the present invention, this requires only a single clock for the access of the entry control store 48. Otherwise, two clocks would be required in order to first access an entry point table 42 followed the next cycle by the access of the vertical control store 58.

I claim:

1. In a central processing unit having apparatus for executing macroinstructions emulated by microinstructions having a plurality of lines of microcode, a control store arrangement including:
an entry point table, addressed by said macroinstructions, for providing a pointer related to each of said macroinstructions,
a control store having output lines, responsive to each of said pointers, for providing on output lines connected thereto the second and subsequent lines of said microcode for each of said macroinstructions,
an entry control store, containing the first line of microcode for each macroinstruction, addressed by said macroinstructions, having output lines,
selection means, responsive to microcode indicia in each of said macroinstructions which indicates that execution of the next of said macroinstructions should be started, for selectively connecting said output lines of said control store or said output lines of said entry control store to said bus.

2. The control store arrangement of claim 1, further including inhibit means in said selection means, responsive to a test result signal, for inhibiting the connection of said output lines of said entry control store to said bus.

3. In a central processing unit having apparatus for executing instructions including an entry point table connected to at least one control store wherein macroinstructions address said entry point table to access a pointer to obtain microcode from said control store for execution by data processing apparatus:
entry control store means addressed by said macroinstruction, for providing the first line of said microcode for execution by said data processing apparatus independent of said entry point table and said control store.

4. A method for providing microcode for a macroinstruction to an execution apparatus including the steps of:
fetching said macroinstruction during a first clock period;
applying said macroinstruction to a first storage apparatus containing a first line of said microcode during a second clock period;
applying said macroinstruction to a second storage apparatus containing a pointer to second and subsequent lines of said microcode during said second clock period;
connecting said first storage apparatus to said execution apparatus during said second clock period;
applying said pointer to a third storage apparatus containing said second and subsequent lines of microcode during a third clock period;
connecting said third storage apparatus to said execution apparatus during said third clock period.

5. The method of claim 4 including the further steps of:
(a) incrementing said pointer during said third clock period and clock periods subsequent to said third clock period;
(b) connecting said third storage apparatus to said execution means during clock periods subsequent to said third clock period;
repeating steps 1 and 2 until a microcode field in said macroinstruction directs the occurrence of said first clock period.

6. The method of claims 4 or 5, including the further step of inhibiting the connection of said first storage apparatus to said execution apparatus in response to a test result signal.

* * * * *